Dec. 8, 1953 G. HERZOG ET AL 2,661,897
ELECTRICAL ANALOGUE
Filed June 10, 1949 2 Sheets-Sheet 1
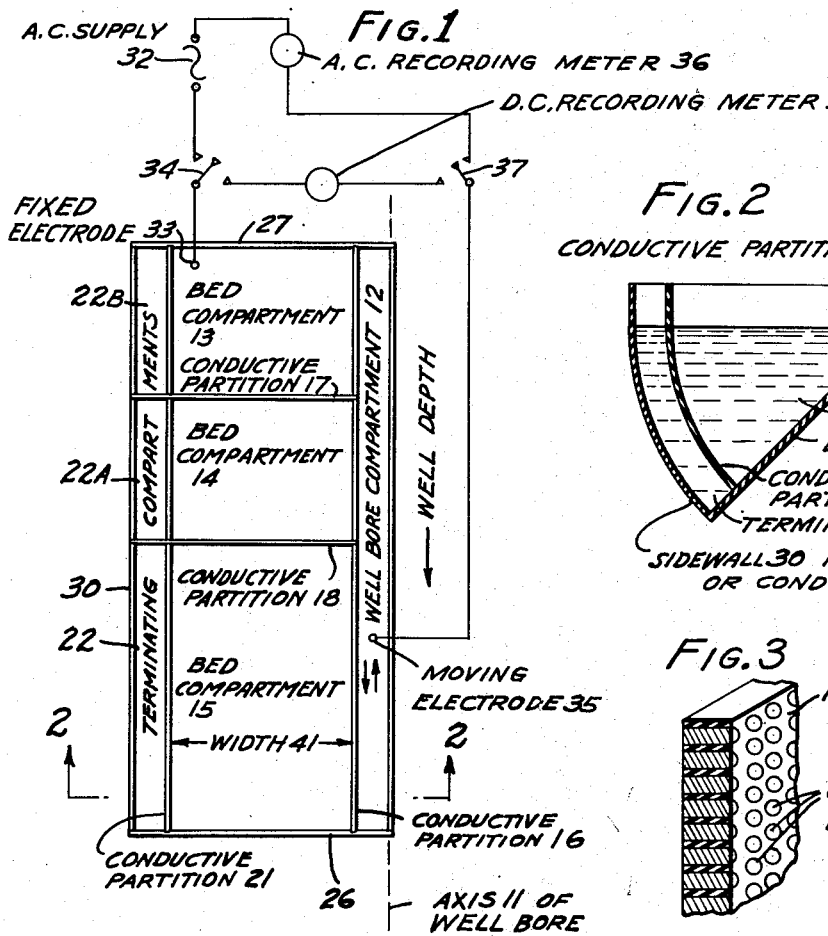
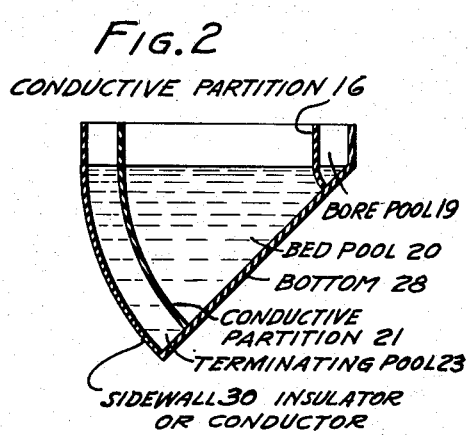
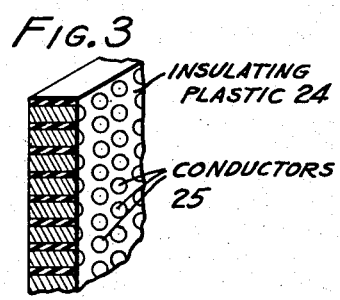
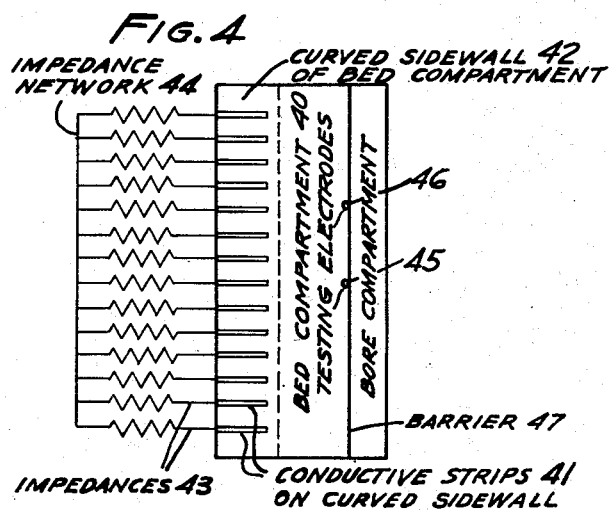
GERHARD HERZOG,
BURTON D. LEE,
INVENTORS,
BY Daniel Stryker
ATTORNEY.

Dec. 8, 1953 G. HERZOG ET AL 2,661,897
ELECTRICAL ANALOGUE
Filed June 10, 1949 2 Sheets-Sheet 2

GERHARD HERZOG,
BURTON D. LEE,
INVENTORS,

BY Daniel Stryker

ATTORNEY.

Patented Dec. 8, 1953

2,661,897

UNITED STATES PATENT OFFICE 2,661,897

ELECTRICAL ANALOGUE

Gerhard Herzog and Burton D. Lee, Houston, Tex., assignors to The Texas Company, New York, N. Y., a corporation of Delaware Application June 10, 1949, Serial No. 98,268

9 Claims. (Cl. 235—61)

This invention relates to potentiometric models employed for the solution of problems encountered in the investigation of electrical, magnetic, mechanical, hydraulic, and thermal systems, and is concerned particularly with eliminating the effects of the finite boundaries of the model in cases in which the medium represented by a pool of electrolyte in the model is in actuality of infinite or at least of very greatly disproportionate extent in at least one direction. The invention provides apparatus to this end.

As disclosed in co-pending applications Serial No. 788,989, filed December 1, 1947, by Burton D. Lee (now U. S. Patent No. 2,569,816); Serial No. 791,797, filed December 15, 1947, by Alexander Wolf (now U. S. Patent No. 2,569,510); Serial No. 791,796, filed December 15, 1947, by Wolf and Lee (now U. S. Patent No. 2,569,817); and Serial No. 93,388, filed May 14, 1949, by Herzog and Lee (now U. S. Patent No. 2,547,950), a number of mechanical, electrical, magnetic, and thermal systems obey Laplace's equation, at least approximately. By way of example, there is a complete analogy between the flow of an uncompressed fluid in a porous medium and the flow of electricity in a conductor. This analogy has been applied to the solution of oil and gas field problems through the construction of electrical analogues. Similar analogies may be drawn between the flow of electricity and (1) the conduction of heat in solid thermal conductors, (2) the distribution of mechanical stresses in a loaded structure, (3) the distribution of flux in electrical, magnetic and electromagnetic fields and (4) the distribution of potentials in a well bore and its surrounding formations in the earth. So the potentiometric model or analogue technique is applicable to problems arising in all of the foregoing cases, examples being the design of hydraulic structures such as dams, the design of electrical apparatus including condensers, insulators, conductive terminals and electrical discharge devices such as vacuum tubes, radiation counters, electrostatic lenses, etc., and the investigation of the fundamentals of electrical logging of oil wells and the like.

Electrical logging is much employed in oil and gas fields to investigate the nature and thickness of the various earth formations penetrated by wells. In electrical logging, currents are set up in the mud or liquid in the well bore and in the formations and the effects of these currents are measured with one or more exploring electrodes which are drawn through the bore, observed potentials being plotted against well depth. In this fashion both "self potential" and "resistivity" logs may be obtained and yield valuable information with respect to sub-surface geology. The interpretation of "self potential" and "resistivity" logs obtained in such wells has been made more accurate due to an investigation of the fundamentals underlying electrical logging with an electrical analogue system employing a potentiometric model of a well and its surrounding formations. This system was developed by Herzog and Lee and is disclosed in the aforementioned co-pending application Serial No. 93,388 (now U. S. Patent No. 2,547,950).

The beds or strata penetrated by a well are, in general, of very great horizontal extent, both in comparison with their thickness and in comparison with the bore of the well. In computing the resistivity departure curves employed to correct the actual resistivity measurements obtained in well logging to "true" resistivity, the dimensions of the beds in a horizontal plane are considered to be infinite, i. e. in a horizontal plane the beds are assumed to be infinite homogeneous media. In a potentiometric model of a well and its surrounding beds, the almost infinite horizontal extent of the beds may be simulated by making the electrolyte pools that represent the beds of very great relative length in a direction transverse to the axis of the pool representing the well bore. However, in most cases this expedient is impractical. Experiments with a potentiometric model of a well and its surrounding formations, such as that employed in the aforementioned system of Herzog and Lee, have shown that for certain types of electrode arrangements, the minimum model dimensions required to obtain a reasonable degree of accuracy in result are much too large for a practical laboratory structure. In short, a boundary at a very great distance, as compared to the maximum dimension of the electrode system in a potentiometric model will have negligible effect on the current and potential distribution in the vicinity of the electrodes; but this fact is not very helpful in some cases, because it requires the use of excessively large models.

In accordance with the instant invention we overcome the above described difficulty by "terminating" a potentiometric model of finite dimensions so as to make it appear to the electrode system as if the model were infinite. Thus in operation of a potentiometric model including a conductor (say a pool of electrolyte) defined by a boundary so that it has a finite dimension in a direction corresponding to that in which the medium represented by the conductor is substantially infinite, or at least very large, the invention contemplates producing a current flow at substantially all points of said boundary which is substantially the same as would exist at the same points in the model if the boundary were moved substantially to infinity. This identity of current applies to magnitude and direction, as well as to phase—in the case of an alternating current. In other words, the effect of moving the boundary to infinity is simulated by maintaining in the conductor (usually a pool of electrolyte) a potential distribution substantially identical to that which would exist in the same portion of the conductor if one or more of its dimensions were infinitely extended.

In terms of apparatus, the invention contemplates in a potentiometric model (including a system of electrodes disposed in a pool of electrolyte intended to represent a medium that is disproportionately greater in extent than the model in at least one direction, measured from the electrode system) the combination which comprises a boundary wall confining the pool in said direction and means for establishing at substantially each point on the boundary wall a current flow of the same magnitude and direction (as well as phase if the current is alternating) as would exist at the same point if the boundary wall were disposed proportionately free from the electrode system.

There are a number of ways in which the required infinite "termination" or boundary may be simulated. One way is to place in the barrier or wall which constitutes the boundary and which is to be "moved" to infinity, a relatively large number of electrodes. Each of these terminating electrodes is connected to a resistor (or impedance in the case of alternating current) and the far end of each of these resistors (impedances) is connected to a common point. The values of the several resistors (impedances) are made such that the potentials at the terminating electrodes in each case are those which would exist at the same points if the pool were infinitely extended.

In the following description and in the appended claims the term "impedance" includes a pure resistance, such as is employed when the current employed in the electrical analogue is direct.

An interconnecting mesh network can be used instead of the simple impedance system described above. If the mesh network is employed the far ends of the mesh may be connected to a common point, or if the impedances of the mesh are properly selected, the far ends of the mesh may be kept separate.

A variant of the mesh network scheme of the invention involves constructing the barrier which constitutes the outside boundary of the pool of insulating material traversed by a large number of independent conductors, so that current is conducted across it but not lengthwise. Thus the barrier may be made, as described in the aforementioned co-pending application of Herzog and Lee, of insulating plastic traversed by a group of small conductors disposed close together at the crossings of a rectangular grid but insulated from each other. Immediately behind the barrier is a pool of conducting fluid, say electrolyte, which may be called the "terminating fluid." Here again it is optional whether or not the far end of the mesh (electrolyte) shall connect to a common point. A common point may be provided by employing a metal sheet as the far barrier which confines the pool of terminating fluid (electrolyte). If the mesh represented by the electrolyte is not to be connected to a common point the far barrier is made of insulating material and the conductivity of the electrolyte adjusted accordingly.

It is convenient to employ an electrolyte as a terminating mesh, because its conductivity is easily adjusted by controlling the concentration of ions in the bath. Moreover, it is usually possible to select a reasonable value for the conductivity of the terminating impedance and then adjust conductivity in the pool or pools of the main model to fit.

If the potentiometric model employed has a regular shape it is frequently possible to compute potential distribution around some simple pair of electrodes in a medium of infinite extent in at least one direction and plot a theoretical potential map for the model with this electrode arrangement. The terminating network or impedance set at the boundary of the model is then adjusted so that observed and theoretical potential distribution in the model coincide. This assures adequate "termination" and permits use of more complex electrode systems in the model.

The instant invention has particular utility in potentiometric models employed to investigate electrical logging phenomena of wells and their surrounding formations, and is described in detail hereinafter with reference to such an application. It is to be understood however, that the invention is generally applicable in potentiometric models whenever it is desirable to eliminate or minimize "boundary" effects, or whenever a medium of infinite dimension or nearly infinite dimension in at least one direction is represented by a conductor of finite dimension in the model. By way of example, it can be employed in a potentiometric model in which a system of electrodes in a pool of aqueous electrolyte of finite dimensions is employed to simulate a system of point electrodes disposed in an infinite medium, such as unconfined air.

The invention will be more thoroughly understood in the light of the following detailed description, taken in conjunction with the accompanying drawings which depict various features of potentiometric model of a well and its surrounding formations. The apparatus illustrated, save for the means employed for "infinite termination" of the boundaries of the model, is substantially the same as that described in the aforementioned co-pending application of Herzog and Lee. Referring to the drawings, Fig. 1 is a diagram of one form of apparatus of the invention, showing in plan a potentiometric model representing a well penetrating three different beds in the earth;

Fig. 2 is a section through the potentiometric model of Fig. 1 along the line 2—2;

Fig. 3 is an enlarged fragmentary perspective view, partly in section, of a conductive barrier employed in the model of Figs. 1 and 2;

Fig. 4 is a diagrammatic plan of a simple potentiometric model of a well employing a network of individual resistors as a "terminating" means;

Figure 5:
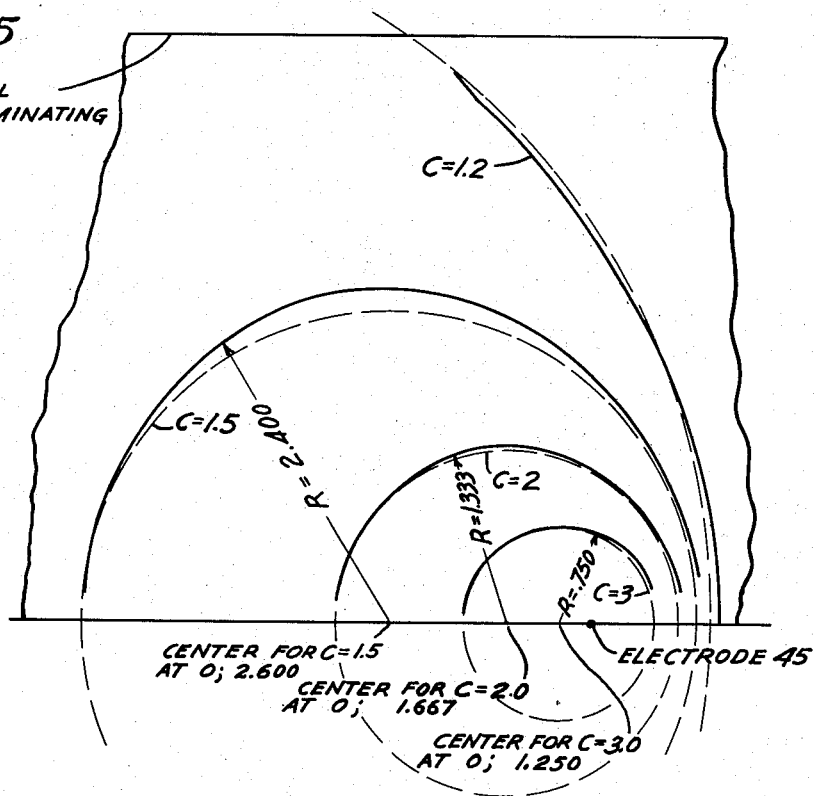
Fig. 5 is a plot of theoretical and actual equipotential lines obtained with a model similar to that of Fig. 4.

The potentiometric model of Figs. 1 and 2 is of wedge-shaped section with the axis 11 of the "well bore" lying horizontally. The well bore is represented by a long narrow compartment 12, and the beds penetrated by the well are represented by a series of deeper compartments 13, 14, 15 adjoining the side of the well bore compartment. The partition 16 between the well bore compartment and the bed compartments and the partitions 17, 18 between the compartments representing the beds are impervious walls or barriers. Each compartment contains a pool of electrolyte (say a water solution of a salt) having a resistivity corresponding to that of the body which it represents. Thus the pool 19 in the well bore compartment has its resistivity adjusted to correspond to the resistivity of the mud in the actual bore hole represented, and the pool 20 in the "bed" compartment 15 has its resistivity adjusted to correspond to the bed it represents.

As already noted, the walls or partitions which separate the "bed" compartments from each other and the "well bore" compartment must be impervious to the electrolyte, but means must be provided for transmitting current across each partition substantially throughout its length but incapable of transmitting current lengthwise of the partition. This is also true of the partition 21, which separates the bed compartments from the terminating compartments 22, 22A, 22B extending longitudinally along the model at the outside and containing terminating pools 23, etc. of electrolyte. One way of accomplishing this result is to bend a series of fine wire U's over a partition of insulating material, the U's being spaced close together but not touching. Each U dips into the pools of electrolyte on opposite sides of the partition and is capable of transmitting current from one pool to the other across the partition, but there is no conduction lengthwise across the partition. Another and preferred way of accomplishing this result (see Fig. 3) is to employ a partition of non-conductive plastic material 24 having a group of conductive wires 25 embedded in it, each wire running directly across the partition and insulated from the other wires. In short, the partition is a conductor in one direction in space only, i. e. normal to its own surface. The partitions 16, 17, 18, 21 of the apparatus of Figs. 1 and 2 are constructed in accordance with Fig. 3. The end walls 26, 27 and the bottom 28 of the apparatus of Figs. 1 and 2 are made of insulating material. For reasons already discussed the side wall 30 of the structure may be of either conductive or insulating material.

Any of the conventional electrode systems used in actual well logging can also be used with the model of Figs. 1, 2 and 3, and either alternating or direct current may be employed. One such conventional system employing alternating current is illustrated in Fig. 1. Alternating current of constant voltage and with a frequency of, say 700 cycles per second, is supplied from an A. C. supply 32 (for example, a vacuum tube oscillator). A fixed electrode 33 disposed in the pool of the bed compartment 13 is connected to one side of the A. C. source through a double throw switch 34. The other side of the A. C. supply is connected to a moving electrode 35 disposed in the well bore compartment through a low impedance A. C. recording meter 36 and another double throw switch 37. Current flows to the moving electrode and back through the bed pools to the fixed electrode, which is located at a point in the model simulating the surface of the ground.

A resistivity log (really an impedance log) is obtained by energizing the model with electric current, just as in resistivity logging of an actual well, and exploring the "well bore" compartment by passing the moving electrode along it, to simulate the exploration in an actual well bore. The A. C. meter 36 records the admittance, i. e. the reciprocal of the impedance between the fixed and moving electrodes as a function of "well depth."

In making a "self potential" log with the logging equipment just described, the moving electrode is passed along the well bore, which is filled with an electrolyte to simulate drilling mud. The switches 34 and 37 are thrown so that the A. C. supply and the A. C. meter are cut out of the circuit and replaced by a high resistance D. C. recording meter 38. For each position of the moving electrode in the "bore," the D. C. meter 38 records the relative potential. These relative potentials are plotted against well depth, usually by direct recording and the result is the "self potential" log. Thus with logging apparatus similar to that of Fig. 1 it is possible to measure the changes in effective resistance (impedance) and the "self potential."

The "self potential" log of a well is affected by various factors, not all of which are as yet clearly understood. However, it is generally accepted that the "self potential" is caused by voltage differences which exist at the boundaries or interfaces between adjoining beds and between the beds and the fluid in the well. These voltages in turn depend on the materials which compose the beds and on the fluids contained in the well and in the beds, as well as upon pressure differences between the fluid in the well and those in the beds. For practical purposes, the aforementioned factors may be grouped into a series of potential differences distributed along the boundaries (a) between beds and (b) between the beds and the well.

These differences can be represented in the well model described by employing barriers which set up potential differences between adjacent pools, although in addition the resistivity of each pool has to be adjusted, as explained previously. One way to set up the required potential difference across the barrier is described by Lee and Herzog in their aforementioned application. They employ an insulating partition having a great number of wires passing through it, as already described, but the several wires are built of two different conductors. Thus each wire may have a right half of iron welded to a left half of copper so that a contact voltage is produced at the junction, the junctions being embedded in the insulator out of which the barrier is built. In effect, the barrier is a wall with a large number of built-in batteries or galvanic piles. By selecting different metal couples, different voltage differences can be set up through the barrier.

Another way to set up the required potential difference across the barrier between pools of electrolyte in a potential model is described and claimed by Allen D. Garrison in co-pending application Serial No. 98,666, filed June 13, 1949. This involves developing a fixed, but adjustable, potential across a barrier separating two pools of electrolyte in a potentiometric model by employing a metal conductor across the barrier, introducing ions of the same metal into the pools, and adjusting the concentration of the ions in at least one of the pools. The potential difference between the pools may be adjusted by introducing into one of the pools a substance which draws the ions into a weakly ionized complex. Independent control over both the potential across the barrier and the conductivity of the pools on either side may be gained by adding to either or both pools an ionizable salt which produces ions that are inert to the metal conductor and do not alter appreciably the activities of the metal ions. "Self potentials" simulating those existing in an actual well may be set up in the model of Figs. 1 and 2 in any of the foregoing ways. For example, different potential differences may be set up through the partition 16, representing the wall of the well bore and the partitions 17, 18 which represent interfaces between beds. Thereafter a self potential log is obtained as in actual well logging by moving the electrode 35 along the well bore compartment and plotting the potential difference noted by the meter 38 against "well depth."

The beds represented by the electrolyte pools in the bed compartments 13, 14, 15 are of very great horizontal extent, so that the width 41 of the bed compartments is disproportionately small, as compared to the width of the well bore compartment or the electrode spacing. This disproportion would affect results obtained in logging experiments conducted with the model as already described were it not for the presence of the conducting partition 21 at the far side of the bed pools and the terminating pools 23. The conducting partition 21 is constructed as shown in Fig. 3 with a myriad of small insulated conductors through the partition in contact with the electrolyte pools on each side. These wires, plus the terminating pool or pools of electrolyte constitute an impedance mesh. By adjusting the conductivity of the terminating pool by increasing or decreasing the ions present therein, the effect of "infinite" termination, as already described, may be obtained and electrical conditions established at the partition 21 identical to those which would exist at the same place in space if the partition were moved to infinity. The side wall 30, as already indicated, may be either insulating or conducting, the conductivities of the terminating electrolytes of the pool 23, being adjusted accordingly.

Fig. 4 represents an alternative form of "infinite" termination for a potentiometric model similar to that of Figs. 1 and 2. However, for purposes of simplicity in illustration, the model of Fig. 4 has only a single "bed" compartment 40 as though the well were drilled through one stratum only. The model of Fig. 4 has no "terminating" pool. Instead a plurality of conductive strips 41 are spaced close together in parallel vertical planes intersecting the curved side wall 42 of the bed compartment, each strip lying on an equipotential line. Each conductive strip is electrically connected to an impedance 43. These impedances 43 are of equal value. The far ends of the several impedances 43 are connected to a common point to form an impedance network 44. For purposes of determining when conditions of "infinite" termination exist in a given case, a pair of electrodes 45, 46 are disposed in the bed compartment on an axis of symmetry adjacent the barrier 41 which represents the side of the well bore. Otherwise the model of Fig. 4 is the same as that of Figs. 1 and 2.

Tests with a model generally similar to that of Fig. 4 show the benefits obtainable in the practice of the invention through the reduction in the effect of a finite boundary on the position of equipotential lines. The bed pool of the model is rectangular with a length of 42 inches and a width of 4½ inches, the depth of electrolyte being uniformly $1\frac{5}{32}$ inches. Side and end walls are vertical. The electrolyte is an aqueous solution having the following approximate concentrations in gms./liter—viz: $CuSO_4$—3; $H_2SO_4$—1; ethyl alcohol —1; the alcohol being employed because of a slight effect it has in suppressing polarization at the electrodes. The resistivity of the solution in ohm centimeters, is 382.5.

The testing electrodes 46, 45 are placed as shown in Fig. 4 on one side of the bed pool, equidistant from the ends and spaced 2 inches from center to center of electrodes. The impedance network 44 consists of 70 vertical copper strips spaced uniformly along the side wall of the model opposite the testing electrodes. Each strip is connected to the network through a 1000 ohm resistor, the far ends of the several resistors being connected to a common point as shown in Fig. 4.

It can be shown that the voltage at any point in an infinite medium surrounding the electrode system of Fig. 4 is given by the equation $$V(x,y) = \frac{Vw}{2\log\frac{2d}{r_w}} \log \frac{X^2+(y+d)^2}{X^2+(y-d)^2}$$

where

V is the voltage at any point in the infinite medium;

X and y are the rectangular coordinates establishing the point at which the voltage is measured in the plane of Fig. 4;

$r_w$ is the radius of the electrodes;

d is one half the distance between the electrodes;

$V_w$ is the voltage at the respective electrodes, one being positive and the other negative.

Equipotential curves in the infinite medium assumed above are given by the equation $$X^2 + \left[y - d\frac{c^2+1}{c^2-1}\right]^2 = \left[\frac{2dc}{c^2-1}\right]^2$$

where c is a constant equal to $\frac{X^2+(y+d)^2}{X^2+(y-d)^2}$

The equipotential curves in the plane of Fig. 4 for an infinite medium are therefore circles with centers located at $$o, \ d\frac{c^2+1}{c^2-1}$$

and with radii of $$\frac{2dc}{c^2-1}$$

Fig. 5 is a plot of theoretical equipotential lines for an infinite medium and of actual equipotential lines obtained in the model just described showing the close correspondence between theory and practice. Without the terminating network, the correspondence is not close.

In Fig. 5 the theoretical equipotential lines are shown dotted, and the actual lines solid. The plotting of the theoretical equipotential lines has already been explained. The plotting of the actual equipotential lines may be done as described in three of the aforementioned co-pending applications (now U. S. Patents No. 2,569,510, No. 2,569,816 and No. 2,569,817).

Figure 6:
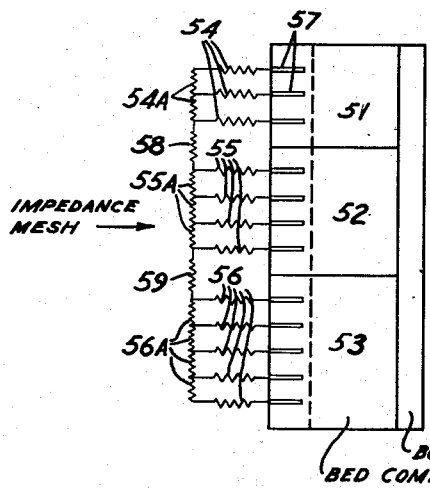
Fig. 6 is a diagrammatic plan of another potentiometric model employing an impedance mesh as a terminating means.

The apparatus of Fig. 6 differs from that of Figs. 1 and 2 in the means employed for infinite termination. It is provided with a long "bore" compartment 50, and three "bed" compartments 51, 52, 53. As in the previous cases, the apparatus is a segment of a circle as viewed in section with the bore compartment adjacent the apex and containing a relatively shallow pool of electrolyte, while the "bed" compartments are deeper and wider. The curved side wall of the apparatus is provided with curved conductive strips 57 which lie respectively in vertical planes in contact with pools of electrolyte in the several bed compartments. Each conductive strip is connected to an impedance. The impedances 54 associated with the bed compartment 51 have a value required to infinitely terminate the pool in that compartment; the impedances 55 associated with the bed compartment 52 have values required to infinitely terminate the pool in that compartment; and the impedances 56 associated with the bed compartment 53 have values required to infinitely terminate the pool in that compartment. The three groups 54, 55, 56 of impedances are interconnected by impedance groups 54A, 55A, 56A respectively, to form individual impedance meshes, and these individual meshes are in turn connected together by impedances 58, 59 which may have any value from 0 to infinity depending upon the conditions to be simulated in the model. In short, the means for infinite termination in Fig. 6 is a mesh of finite impedances which approximates in effect the terminating pools of the apparatus of Figs. 1 and 2.

Figure 7:
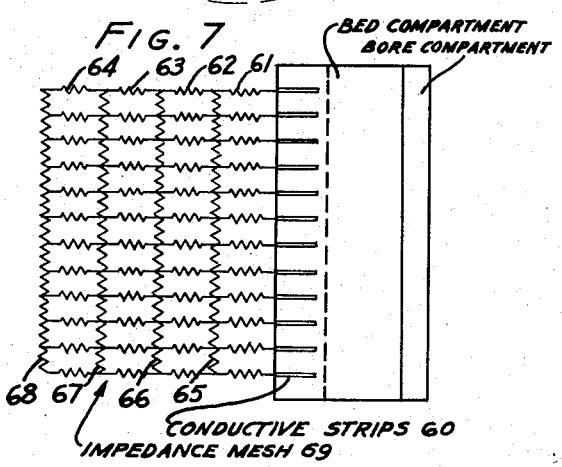
Fig. 7 is a diagrammatic plan of still another potentiometric well model employing a more complicated impedance mesh for termination.

The apparatus of Fig. 7 is identical to that of Fig. 4, except that a more complicated mesh of finite impedances is employed in place of the impedance network. Conductive strips 60 on the side wall of the model in contact with the pool in the bed compartment are connected respectively through individual impedances 61, 62, 63, 64 arranged in series with sets of cross connecting impedances 65, 66, 67, 68 in an impedance mesh 69. The arrangement of impedances in the mesh of Fig. 7 comes closer to approximating the mesh represented by a terminating pool in the apparatus of Figs. 1 and 2 than does the network of Fig. 4. The terminating pool is therefore to be preferred for reasons of simplicity, adjustability, and accuracy of simulation.

We claim:

1. In a potentiometric model including a system of electrodes disposed in a pool of electrolyte intended to represent a medium of relatively great extent in at least one direction measured from the electrode system and a container in which the pool is disposed, the combination which comprises a boundary wall confining disproportionately the pool in said direction, and means for establishing at substantially each point on the boundary wall a current flow of the same magnitude and direction as would exist at the equivalent point if the boundary wall were disposed proportionately from the electrode system, said means comprising a large plurality of conductors crossing said boundary wall, and resistors connected respectively to the conductors, the end of said resistors opposite the conductors being connected to a common point.

2. In a potentiometric model including a system of electrodes disposed in a pool of electrolyte intended to represent a medium of relatively great extent in at least one direction measured from the electrode system and a container in which the pool is disposed, the combination which comprises a boundary wall confining disproportionately the pool in said direction, and means for establishing at substantially each point on the boundary wall a current flow of the same magnitude and direction as would exist at the equivalent point if the boundary wall were disposed proportionately from the electrode system, said means comprising a large plurality of conductors crossing said boundary wall, and a mesh network connecting the conductors.

3. Apparatus according to claim 2 in which the far end of the mesh network is connected to a common point.

4. In a potentiometric model including a system of electrodes disposed in a pool of electrolyte intended to represent a medium of relatively great extent in at least one direction measured from the electrode system, the combination which comprises a boundary wall confining disproportionately the pool in said direction and a container in which the pool is disposed, and means for establishing at substantially each point on the boundary wall a current flow of the same magnitude and direction as would exist at the equivalent point if the boundary wall were disposed proportionately from the electrode system, said means comprising a large number of conductors crossing the boundary walls, a second pool of electrolyte on the far side of the boundary wall in contact with the conductors and a second container in which the second pool is disposed.

5. Apparatus according to claim 4 in which the conductors pass through the boundary wall in the form of a group insulated from each other.

6. Apparatus according to claim 4 in which the pools are backed by a conductive sheet.

7. In a potentiometric model including a system of electrodes disposed in a pool of electrolyte intended to represent a medium of relatively great extent in at least one direction measured from the electrode system, the combination which comprises a container having a boundary wall confining disproportionately the pool in said direction, a large number of conductors crossing the boundary wall, and means for establishing at substantially each point on the boundary wall a current flow of the same magnitude and direction as would exist at the equivalent point if the boundary wall were disposed proportionately from the electrode system.

8. In a potentiometric model including a system of electrodes disposed in a pool of electrolyte intended to represent a medium of relatively great extent in at least one direction measured from the electrode system, the combination which comprises a container having a boundary wall confining disproportionately the pool in said direction, a large number of conductors crossing the boundary wall, and means for establishing at substantially each point on the boundary wall an alternating current of the same magnitude, and direction and phase as would exist at the equivalent point if the boundary wall were disposed proportionately from the electrode system.

9. In a potentiometric model including a system of electrodes disposed in a pool of electrolyte intended to represent a medium of substantially infinite extent in at least one direction measured from the electrode system, the combination which comprises a container for the pool a boundary wall of the container finitely confining the pool in said direction, a large number of conductors crossing the boundary wall, and means for establishing at substantially each point on the boundary wall current flow of the same magnitude and direction as would exist at the equivalent point if the boundary wall were substantially infinitely disposed from the electrode system.

GERHARD HERZOG.
BURTON D. LEE.

References Cited in the file of this patent

UNITED STATES PATENTS

| Number | Name | Date |
| --- | --- | --- |
| 809,085 | Blackmore | Jan. 2, 1906 |
| 1,070,454 | Griswald | Aug. 19, 1913 |
| 2,257,536 | Roycroft | Sept. 30, 1941 |
| 2,423,754 | Bruce | July 8, 1947 |
| 2,459,561 | Yawman | Jan. 18, 1949 |